(12) United States Patent
Cass et al.

(10) Patent No.: US 11,673,585 B2
(45) Date of Patent: Jun. 13, 2023

(54) INTEGRATED MODULE FOR SENSOR DATA AGGREGATION AND CONTROL OF SENSOR SUPPORT HARDWARE

(71) Applicant: GM Cruise Holdings LLC, San Francisco, CA (US)

(72) Inventors: Devin Cass, San Francisco, CA (US); Katharine Li, Oakland, CA (US); Cameron Matzke, Palo Alto, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 482 days.

(21) Appl. No.: 16/887,084

(22) Filed: May 29, 2020

(65) Prior Publication Data

US 2021/0370975 A1 Dec. 2, 2021

(51) Int. Cl.
| | |
|---|---|
| *B60W 60/00* | (2020.01) |
| *G05D 1/00* | (2006.01) |
| *B60W 10/24* | (2006.01) |
| *B60S 1/02* | (2006.01) |
| *B60W 10/04* | (2006.01) |

(52) U.S. Cl.
CPC .......... *B60W 60/0025* (2020.02); *B60S 1/02* (2013.01); *B60W 10/04* (2013.01); *B60W 10/24* (2013.01); *G05D 1/0088* (2013.01); *G05D 2201/0213* (2013.01)

(58) Field of Classification Search
CPC .. B60W 60/0025; B60W 10/04; B60W 10/24; B60S 1/02; G05D 1/0088; G05D 2201/0213
USPC .......................................................... 701/23
See application file for complete search history.

(56) References Cited

U.S. PATENT DOCUMENTS

| | | | |
|---|---|---|---|
| 2016/0167668 A1* | 6/2016 | Prokhorov | B60W 40/06 701/302 |
| 2018/0143298 A1* | 5/2018 | Newman | G01C 21/3484 |
| 2021/0268995 A1* | 9/2021 | Krishnan | F16K 27/003 |
| 2022/0332513 A1* | 10/2022 | Hessler | B65G 45/26 |
| 2022/0339669 A1* | 10/2022 | Peret | B08B 7/02 |

* cited by examiner

*Primary Examiner* — Yazan A Soofi
(74) *Attorney, Agent, or Firm* — Polsinelli PC

(57) ABSTRACT

Systems, methods, and computer-readable media are provided for receiving first data from a first sensor utilizing a first communication protocol, wherein the first sensor is positioned in an aggregation zone, receiving second data from a second sensor utilizing a second communication protocol, wherein the second sensor is positioned in the aggregation zone, processing the first data received from the first sensor and the second data received from the second sensor to conform the first communication protocol and the second communication protocol, and providing instructions based on the processed first data and the processed second data in a third communication protocol, wherein the instructions adjust auxiliary functions of an autonomous vehicle.

20 Claims, 6 Drawing Sheets

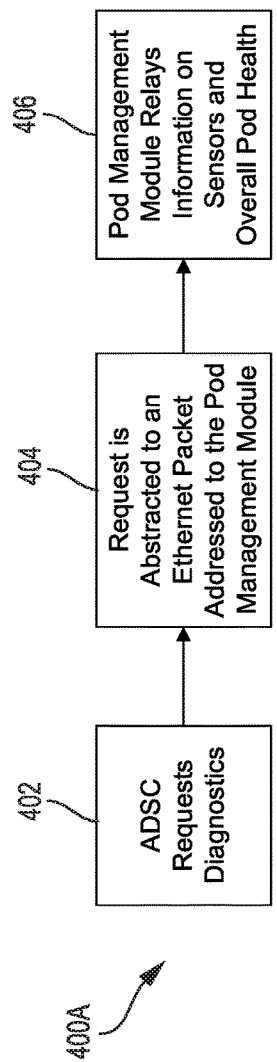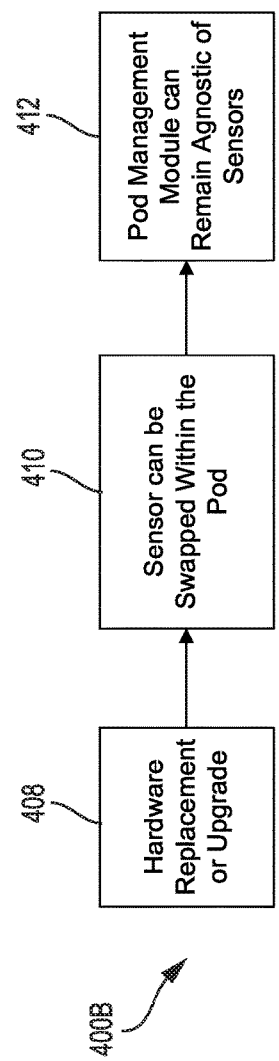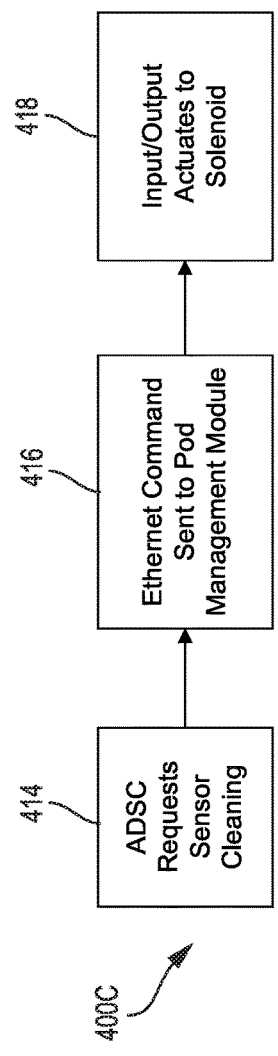

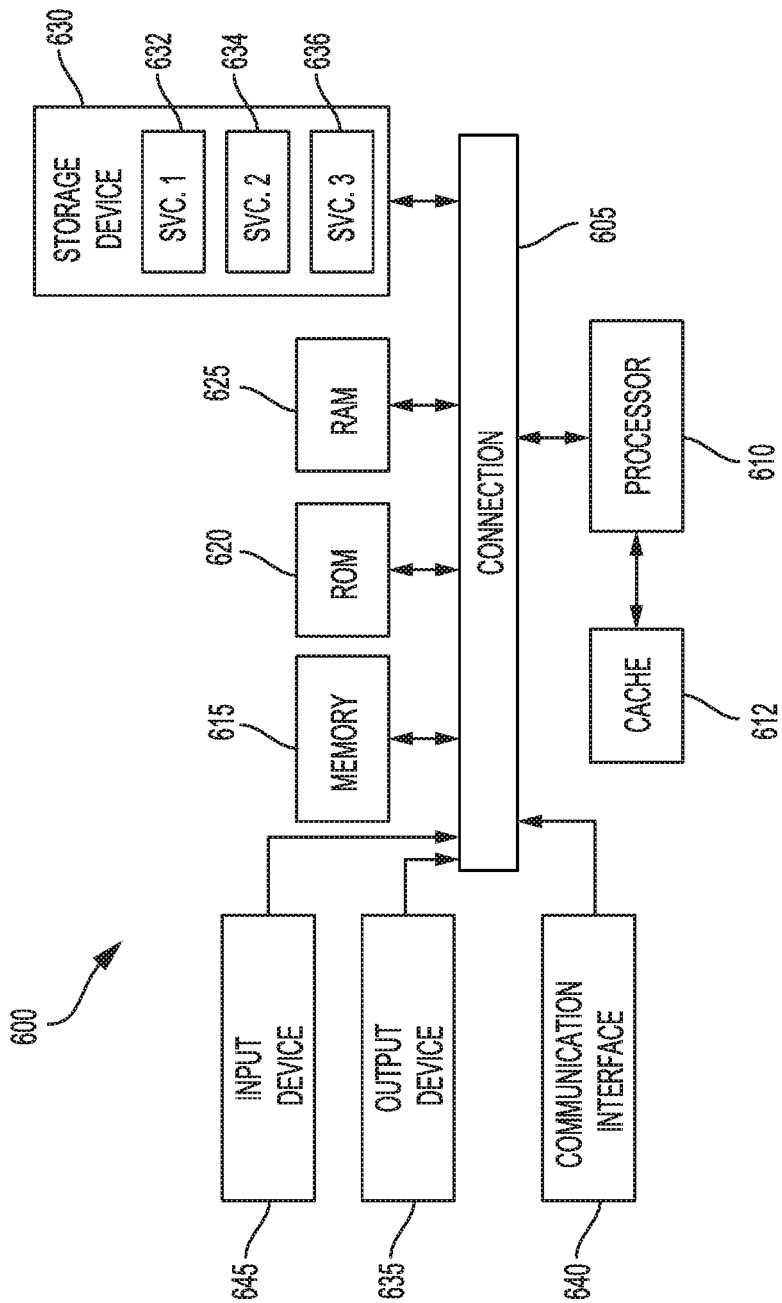

INTEGRATED MODULE FOR SENSOR DATA AGGREGATION AND CONTROL OF SENSOR SUPPORT HARDWARE

BACKGROUND

1. Technical Field

The subject technology provides solutions for autonomous vehicles, and in particular, for managing a plurality of sensors to enable modular and upgradeable sensing for autonomous vehicles.

2. Introduction

Autonomous vehicles are vehicles having computers and control systems that perform driving and navigation tasks conventionally performed by a human driver. As autonomous vehicle technologies continue to advance, ride-hailing services will increasingly utilize autonomous vehicles to improve service safety and efficiency. For effective use in ride-hailing deployments, autonomous vehicles will be required to execute many service functions that are conventionally performed by human drivers.

Currently, autonomous vehicles include a main vehicle computer that is individually connected to all of the sensors that are positioned throughout the autonomous vehicle. This type of sensor connectivity arrangement requires many connection ports, wiring harnesses, a large enclosure, and unique firmware as each sensor includes its own respective firmware that is independently developed by the manufacturer. For example, the sensors are built by automotive Tier 1 manufacturers that have no cross-functional knowledge of sensors from other manufacturers. Packaging several enclosures into a small space, writing unique driver code for each sensor, sourcing several different automotive grade connectors, and managing several Tier 1 suppliers is extremely challenging, expensive, and time-consuming.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

FIGS. 4A-4C illustrate examples of sensor aggregation processes, according to some aspects of the disclosed technology.

FIG. 6 illustrates an example processor-based system with which some aspects of the subject technology can be implemented.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

Figure 1:
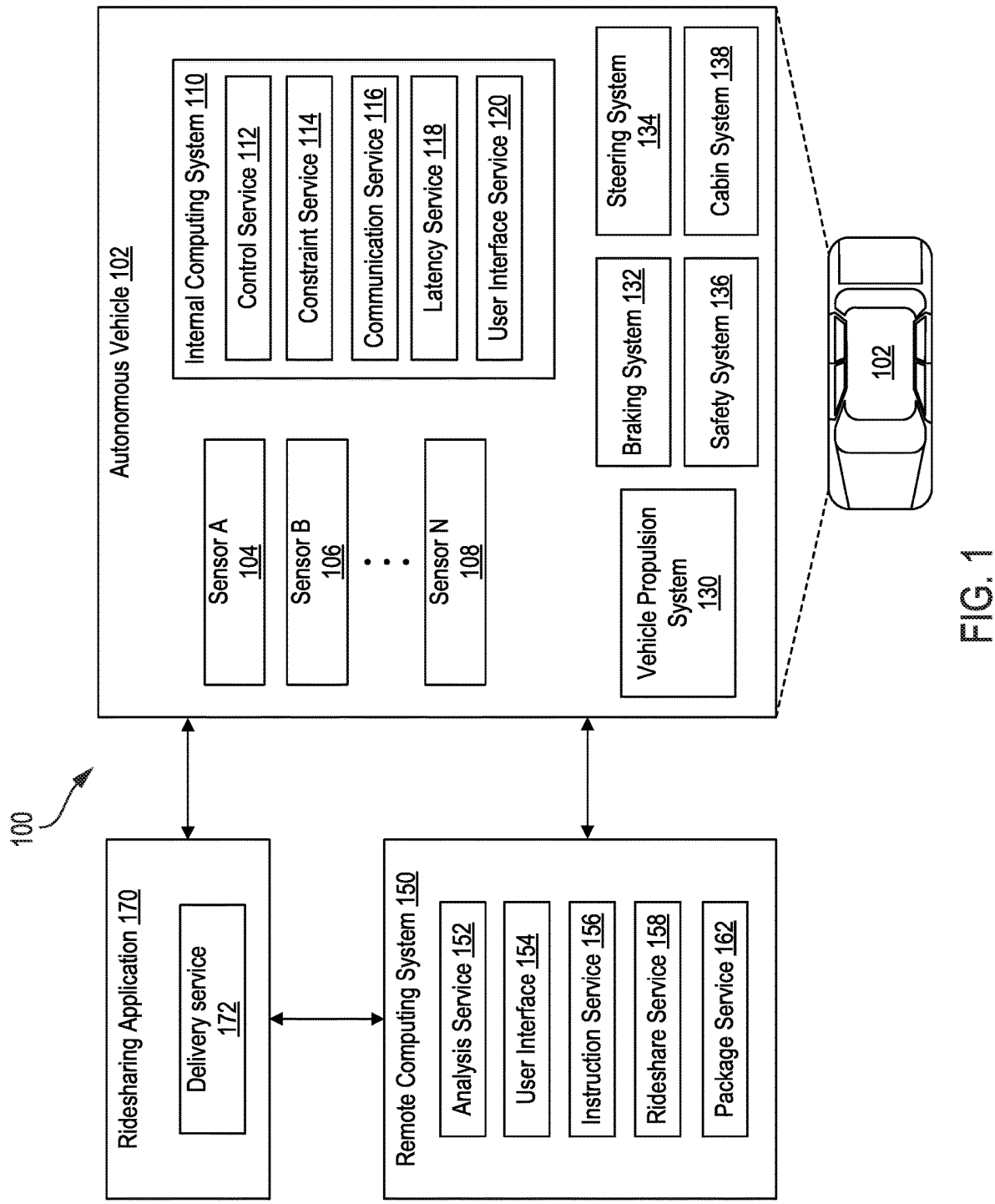
FIG. 1 illustrates an example environment that includes an autonomous vehicle in communication with a remote computing system, according to some aspects of the disclosed technology.

FIG. 1 illustrates an example autonomous vehicle environment 100. The example autonomous vehicle environment 100 includes an autonomous vehicle 102, a remote computing system 150, and a ridesharing application 170. The autonomous vehicle 102, remote computing system 150, and ridesharing application 170 can communicate with each other over one or more networks, such as a public network (e.g., a public cloud, the Internet, etc.), a private network (e.g., a local area network, a private cloud, a virtual private network, etc.), and/or a hybrid network (e.g., a multi-cloud or hybrid cloud network, etc.).

The autonomous vehicle 102 can navigate about roadways without a human driver based on sensor signals generated by sensors 104-108 on the autonomous vehicle 102. The sensors 104-108 on the autonomous vehicle 102 can include one or more types of sensors and can be arranged about the autonomous vehicle 102. For example, the sensors 104-108 can include, without limitation, one or more inertial measuring units (IMUs), one or more image sensors (e.g., visible light image sensors, infrared image sensors, video camera sensors, surround view camera sensors, etc.), one or more light emitting sensors, one or more global positioning system (GPS) devices, one or more radars, one or more light detection and ranging sensors (LIDARs), one or more sonars, one or more accelerometers, one or more gyroscopes, one or more magnetometers, one or more altimeters, one or more tilt sensors, one or more motion detection sensors, one or more light sensors, one or more audio sensors, etc. In some implementations, sensor 104 can be a radar, sensor 106 can be a first image sensor (e.g., a visible light camera), and sensor 108 can be a second image sensor (e.g., a thermal camera). Other implementations can include any other number and type of sensors.

The autonomous vehicle 102 can include several mechanical systems that are used to effectuate motion of the autonomous vehicle 102. For instance, the mechanical systems can include, but are not limited to, a vehicle propulsion system 130, a braking system 132, and a steering system 134. The vehicle propulsion system 130 can include an electric motor, an internal combustion engine, or both. The braking system 132 can include an engine brake, brake pads, actuators, and/or any other suitable componentry configured to assist in decelerating the autonomous vehicle 102. The steering system 134 includes suitable componentry configured to control the direction of movement of the autonomous vehicle 102 during navigation.

The autonomous vehicle 102 can include a safety system 136. The safety system 136 can include lights and signal indicators, a parking brake, airbags, etc. The autonomous vehicle 102 can also include a cabin system 138, which can include cabin temperature control systems, in-cabin entertainment systems, etc.

The autonomous vehicle 102 can include an internal computing system 110 in communication with the sensors 104-108 and the systems 130, 132, 134, 136, and 138. The internal computing system 110 includes one or more processors and at least one memory for storing instructions executable by the one or more processors. The computer-executable instructions can make up one or more services for controlling the autonomous vehicle 102, communicating with remote computing system 150, receiving inputs from passengers or human co-pilots, logging metrics regarding data collected by sensors 104-108 and human co-pilots, etc.

The internal computing system 110 can include a control service 112 configured to control operation of the vehicle propulsion system 130, the braking system 132, the steering system 134, the safety system 136, and the cabin system 138. The control service 112 can receive sensor signals from the sensors 104-108 can communicate with other services of the internal computing system 110 to effectuate operation of the autonomous vehicle 102. In some examples, control service 112 may carry out operations in concert with one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction on navigation that is activated in accordance with protocols configured to avoid occupying the same space as other objects, abide by traffic laws, circumvent avoidance areas, etc. In some examples, the constraint service 114 can be part of the control service 112.

The internal computing system 110 can also include a communication service 116. The communication service 116 can include software and/or hardware elements for transmitting and receiving signals to and from the remote computing system 150. The communication service 116 can be configured to transmit information wirelessly over a network, for example, through an antenna array or interface that provides cellular (long-term evolution (LTE), 3rd Generation (3G), 5th Generation (5G), etc.) communication.

In some examples, one or more services of the internal computing system 110 are configured to send and receive communications to remote computing system 150 for reporting data for training and evaluating machine learning algorithms, requesting assistance from remote computing system 150 or a human operator via remote computing system 150, software service updates, ridesharing pickup and drop off instructions, etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150, as information can quickly become too stale to be actionable. When the latency service 118 determines that a response has not been received within a threshold period of time, the latency service 118 can enable other systems of autonomous vehicle 102 or a passenger to make decisions or provide needed feedback.

The internal computing system 110 can also include a user interface service 120 that can communicate with cabin system 138 to provide information or receive information to a human co-pilot or passenger. In some examples, a human co-pilot or passenger can be asked or requested to evaluate and override a constraint from constraint service 114. In other examples, the human co-pilot or passenger may wish to provide an instruction to the autonomous vehicle 102 regarding destinations, requested routes, or other requested operations.

As described above, the remote computing system 150 can be configured to send and receive signals to and from the autonomous vehicle 102. The signals can include, for example and without limitation, data reported for training and evaluating services such as machine learning services, data for requesting assistance from remote computing system 150 or a human operator, software service updates, rideshare pickup and drop off instructions, etc.

The remote computing system 150 can include an analysis service 152 configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, images, sounds reported from the autonomous vehicle 102 to an operator of remote computing system 150, maps, routes, navigation data, notifications, user data, vehicle data, software data, and/or any other content. User interface service 154 can receive, from an operator, input instructions for the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on computing devices, such as tablet computers, laptop computers, smartphones, head-mounted displays (HMDs), gaming systems, servers, smart devices, smart wearables, and/or any other computing devices. In some cases, such computing devices can be passenger computing devices. The rideshare service 158 can receive from passenger ridesharing app 170 requests, such as user requests to be picked up or dropped off, and can dispatch autonomous vehicle 102 for a requested trip.

The rideshare service 158 can also act as an intermediary between the ridesharing app 170 and the autonomous vehicle 102. For example, rideshare service 158 can receive from a passenger instructions for the autonomous vehicle 102, such as instructions to go around an obstacle, change routes, honk the horn, etc. The rideshare service 158 can provide such instructions to the autonomous vehicle 102 as requested.

The remote computing system 150 can also include a package service 162 configured to interact with the ride-sharing application 170 and/or a delivery service 172 of the ridesharing application 170. A user operating ridesharing application 170 can interact with the delivery service 172 to specify information regarding a package to be delivered using the autonomous vehicle 102. The specified information can include, for example and without limitation, package dimensions, a package weight, a destination address, delivery instructions (e.g., a delivery time, a delivery note, a delivery constraint, etc.), and so forth.

The package service 162 can interact with the delivery service 172 to provide a package identifier to the user for package labeling and tracking. Package delivery service 172 can also inform a user of where to bring their labeled package for drop off. In some examples, a user can request the autonomous vehicle 102 come to a specific location, such as the user's location, to pick up the package. While delivery service 172 has been shown as part of the ridesharing application 170, it will be appreciated by those of ordinary skill in the art that delivery service 172 can be its own separate application.

One beneficial aspect of utilizing autonomous vehicle 102 for both ridesharing and package delivery is increased utilization of the autonomous vehicle 102. Instruction service 156 can continuously keep the autonomous vehicle 102 engaged in a productive itinerary between rideshare trips by filling what otherwise would have been idle time with productive package delivery trips.

Autonomous vehicles are vehicles having computers and control systems that perform driving and navigation tasks conventionally performed by a human driver. As autonomous vehicle technologies continue to advance, ride-hailing services will increasingly utilize autonomous vehicles to improve service safety and efficiency. For effective use in ride-hailing deployments, autonomous vehicles will be required to execute many service functions that are conventionally performed by human drivers.

Currently, autonomous vehicles include a main vehicle computer that is individually connected to all of the sensors that are positioned throughout the autonomous vehicle. This type of sensor connectivity arrangement requires many connection ports, wiring harnesses, a large enclosure, and unique firmware as each sensor includes its own respective firmware that is independently developed by the manufacturer. For example, the sensors are built by automotive Tier 1 manufacturers that have no cross-functional knowledge of sensors from other manufacturers. Packaging several enclosures into a small space, writing unique driver code for each sensor, sourcing several different automotive grade connectors, and managing several Tier 1 suppliers is extremely challenging, expensive, and time-consuming.

As such, a need exists for a system and a method that can efficiently and effectively aggregate sensor data, thereby providing a modular sensor data system for autonomous vehicles.

Figure 2:
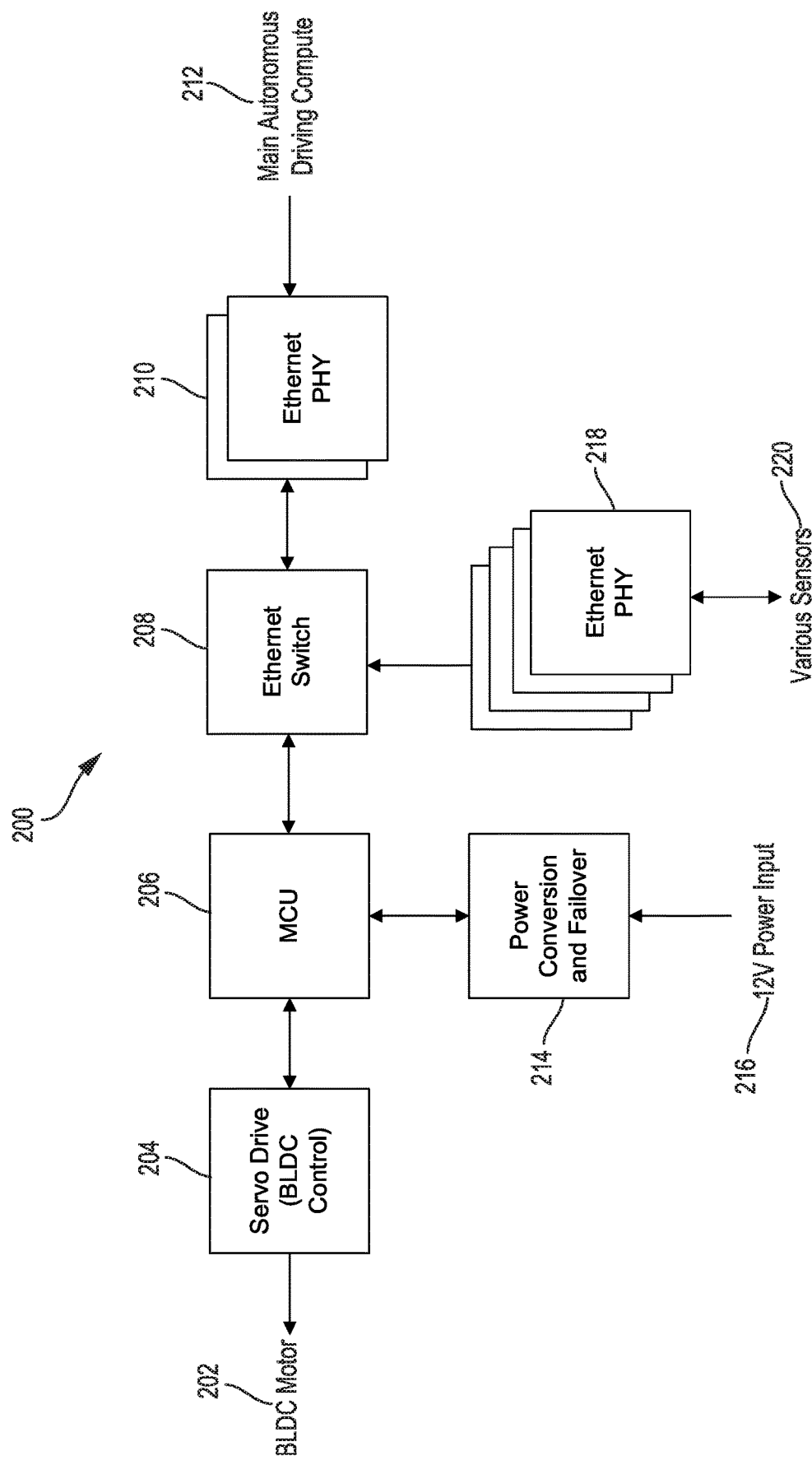
FIG. 2 illustrates an example topology of a sensor data aggregation system, according to some aspects of the disclosed technology.
Figure 3:
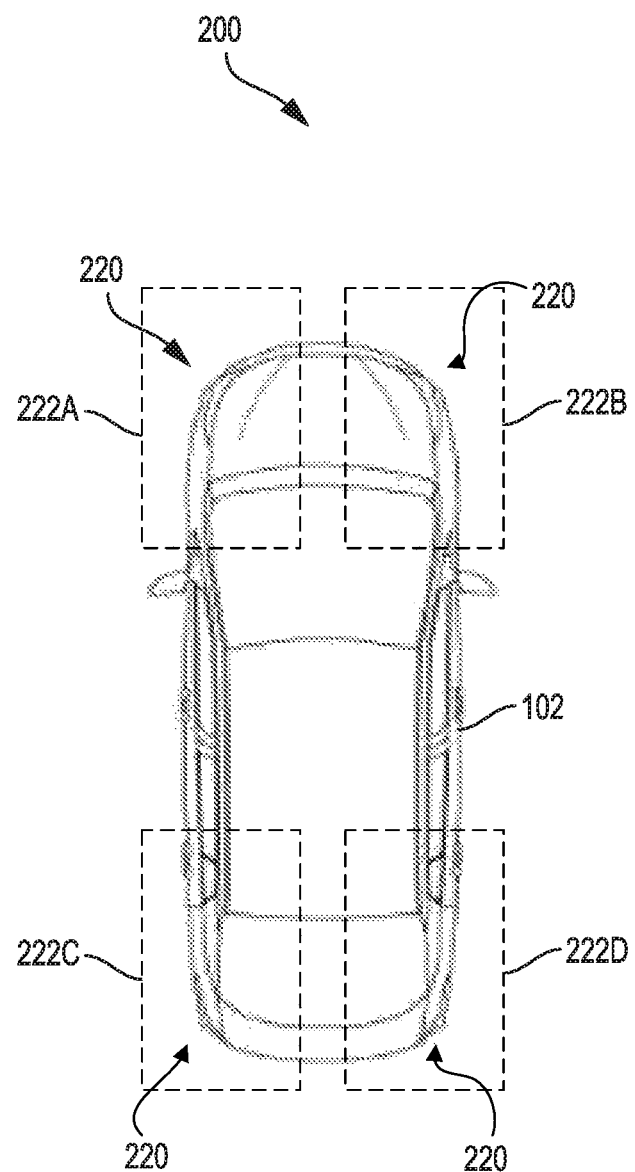
FIG. 3 illustrates an example of zones of the sensor data aggregation system of FIG. 2, according to some aspects of the disclosed technology.

FIG. 2 illustrates an example topology of a sensor data aggregation system 200, according to some aspects of the disclosed technology. FIG. 3 illustrates an example of zones 222A-222D of the sensor data aggregation system 200 of FIG. 2, according to some aspects of the disclosed technology.

Sensor Data Aggregation System:

In some instances, the sensor data aggregation system 200 can be an integrated controller that manages temperature, sensor cleaning, motor control, data aggregation, power supply, or any other auxiliary function that is suitable for the intended purpose and understood by a person of ordinary skill in the art to enable modular and upgradeable sensing for autonomous driving.

The sensor data aggregation system 200 can also aggregate the above-referenced auxiliary functions into a module, thereby reducing the overall cost, size, connector count, and mass of the sensor data aggregation system 200. In some instances, the sensor data aggregation system 200 can streamline firmware driver development into a codebase, which can further reduce an overall interface with a main autonomous vehicle computer, while reducing an overall autonomous vehicle component count.

The sensor data aggregation system 200 can include a servo-drive 204 (e.g., a brushless direct current (DC) control), a microcontroller unit ("MCU") 206, an Ethernet switch 208, an Ethernet physical layer ("PHY") 210, and a power conversion and failover unit 214. The sensor data aggregation system 200 may be communicatively coupled to a brushless DC motor 202, a main autonomous driving compute 212, a 12V power source 216, and a plurality of sensors 220.

In some instances, the sensor data aggregation system 200 can be integrated into a small package that can be positioned alongside the various sensors 220 of the autonomous vehicle 102. The sensor data aggregation system 200 can further include one or more printed circuit boards (PCB) populated with the microcontroller 206, the servo drive 204, the power management 214, and the Ethernet switch 208 and physical layer integrated circuits ("IC") 210, 218. In other instances, the sensor data aggregation system 200 can include PCB connectors that interface with the sensor data aggregation system's 200 wiring harness, the sensors 220, and supporting content such as motors 202, thermocouples, or any other supporting content suitable for the intended purpose and understood by a person of ordinary skill in the art. In such an instance, the sensors 220 can be connected to the sensor data aggregation system 200 rather than be directly connected to the main autonomous driving compute 212, thereby reducing the numbers of connections with the main autonomous driving compute 212.

In other instances, the sensor data aggregation system 200 can be agnostic of the sensors 220 that the sensor data aggregation system 200 aggregates, and can further be prepared for future expansion. The sensor data aggregation system 200 can include input/output interfaces to provide interfaces for additional sensing or actuation in the event that additional auxiliary functions are added to the sensor data aggregation system 200. This also allows the sensor data aggregation system 200 to be used in several instances on the autonomous vehicle 102 and to not be paired with a specific sensor set or sensor enclosure.

Sensors:

The autonomous vehicle 102 of the sensor data aggregation system 200 can include various sensors 220 to detect objects such as camera sensors, light detection and ranging (LIDAR) sensors, radio detection and ranging (RADAR) sensors, and any other sensor suitable for the intended purpose and understood by a person of ordinary skill in the art. The sensors 220 collect data and measurements that the autonomous vehicle 102 can use for operations such as navigation and automotive controls.

The sensors 220 can provide the data and measurements to an internal computing system (e.g., the main autonomous driving compute 212) of the autonomous vehicle 102, which can use the data and measurements to control a mechanical system of the autonomous vehicle 102, such as a vehicle propulsion system, a braking system, a door lock system, or a steering system. Furthermore, the sensors 220 can be mounted at fixed locations on the autonomous vehicle 102 to provide optimum views of the surrounding area. In some instances, the sensors 220 of the sensor data aggregation system 200 can determine the speed, trajectory, distance, position, size, or any other parameter of an object suitable for the intended purpose and understood by a person of ordinary skill in the art.

Aggregation Zones:

In some instances, the zones 222A-222D (e.g., aggregation zones) of the sensor data aggregation system 200 can include areas around the autonomous vehicle 102 that may be proximate to a cluster of sensors 220 and/or physical components of the autonomous vehicle 102. For example, as shown in FIG. 3, the aggregation zones 222A-222D are illustrated as four quadrants of the autonomous vehicle 102 (e.g., a front driver quadrant 222A, a front passenger quadrant 222B, a rear driver quadrant 222C, and a rear passenger quadrant 222D). The number and size of aggregation zones can also vary depending on the quantity, size, and position of the various sensors 220 around the autonomous vehicle 102. For example, the sensor data aggregation system 200 can include six aggregation zones, one aggregation zone on the left driver side and another aggregation zone on the right passenger side. In some instances, the sensor data aggregation system 200 can aggregate the sensor data from each of the aggregation zones 222A-222D, process the aggregated sensor data, and provide instructions to corresponding components of the autonomous vehicle 102 accordingly.

Autonomous Driving Compute Instructions:

In other instances, the sensor data aggregation system 200 can receive instructions and commands from the main autonomous driving compute 212 (e.g., a central autonomous driving system computer (ADSC)) over an interface such as a controller area network ("CAN bus"), Ethernet, or any other interface suitable for the intended purpose and understood by a person of ordinary skill in the art. After receiving commands from the main autonomous driving compute 212 and/or the sensors 220, the sensor data aggregation system 200 can communicate internally to provide instructions to the servo drive 204 (e.g., motor controller). For example, if the main autonomous driving compute 212 requests a different azimuth angle for an articulator of the autonomous vehicle 102, the main autonomous driving compute 212 can provide a command to the sensor data aggregation system 200, which can then utilize stored corresponding firmware to request the azimuth angle of the BLDC motor 202 via the motor controller (e.g., servo drive 204).

Auxiliary Functions:

In some instances, the sensor data aggregation system 200 can be a subcomponent in an upgradeable sensor aggregation module (e.g., a sensor "pod") that can be configured to manage articulator motor control, temperature control, sensor cleaning control, power supply, data aggregation, and other auxiliary functions to support sensor integration with the autonomous vehicle 102. For example, the sensor data aggregation system 200 can aggregate the following auxiliary functions into a system: DC motor (e.g., brushless) control and actuation 204, fan control and thermal management, solenoid and/or local diaphragm compressor control and actuation, data aggregation (e.g., Ethernet switch 208), and redundant power control 214.

1) DC Motor Control and Actuation:

In some instances, the sensor data aggregation system 200 can be configured to control the BLDC motor 202 or any other motor suitable for the intended purpose and understood by a person of ordinary skill in the art via the servo drive 204. The sensor data aggregation system 200 can control the BLDC motor 202 based on instructions from the main autonomous driving compute 212 or from data received from the sensors 220. For example, if the sensor data aggregation system 200 receives instructions from the main autonomous driving compute 212 regarding controlling the BLDC motor 202, the sensor data aggregation system 200 can execute the instructions accordingly and provide corresponding instructions to the servo drive 204 that then controls the BLDC motor 202. In other instances, the sensor data aggregation system 200 can receive data from the sensors 220 via the Ethernet PHY 218 and the Ethernet switch 208, and independently determine whether to control certain aspects of the autonomous vehicle 102 such as the BLDC motor 202 (e.g., independent of the main autonomous driving compute 212). In such a case, the sensor data aggregation system 200 can be autonomous of the main autonomous driving compute 212 and independently control the BLDC motor 202. Thereafter, the sensor data aggregation system 200 can provide instructions to the BLDC motor 202 via the servo drive 204.

2) Fan Control and Thermal Management:

In some instances, the sensor data aggregation system 200 can be configured to include fan control and thermal management of the autonomous vehicle 102. For example, the sensor data aggregation system 200 can receive data from the sensors 220 that may indicate that a particular zone 222A-222D is overheating. In this instance, the sensor data aggregation system 200 can activate fans and thermal controls in the corresponding zone 222A-222D to decrease the temperature of the zone 222A-222D. In other instances, the sensor data aggregation system 200 can perform fan control and thermal management independent of the main autonomous driving compute 212.

3) Solenoid and/or Local Diaphragm Compressor Control and Actuation:

In some instances, the sensor data aggregation system 200 can be configured to include solenoid and/or local diaphragm compressor control and actuation. For example, if the sensor data aggregation system 200 receives instructions from the main autonomous driving compute 212 to clean a part of the autonomous vehicle 102, the sensor data aggregation system 200 can activate a solenoid or actuate a diaphragm compressor to clean the corresponding part of the autonomous vehicle 102. The sensor data aggregation system 200 can also be configured to receive data from the sensors 220 indicating that a part of the autonomous vehicle 102 should be cleaned. In such an instance, the sensor data aggregation system 200 can activate a solenoid or actuate a diaphragm compressor to clean the corresponding part of the autonomous vehicle 102, independent of receiving instructions from the main autonomous driving compute 212.

4) Data Aggregation:

In some instances, the sensor data aggregation system 200 can be configured to aggregate data from the sensors 220. For example, the sensor data aggregation system 200 can receive data from sensors 220 having different communication protocols from one another, process the received data from the sensors 220 to a communication protocol designated by the main autonomous driving compute 212, and provide the processed data to the main autonomous driving compute 212. This can allow the sensor data aggregation system 200 to convert the communication protocol of the sensors 220 so that the main autonomous driving compute 212 can reserve its resources for other tasks. In some instances, the Ethernet switch 208 and the Ethernet PHY 210, 218 may be one example of a communication protocol. In other instances, examples of communication protocols (e.g., inter-pod) may include Gigabit Multimedia Serial Link (GMSL), Flat Panel Display Link (FPD Link), 100B-T1 (Broad-R Reach), 1000B-Tx, controller area network (CAN), local interconnect network (LIN), and any other type of communication protocol that can be utilized for the intended purpose and understood by a person of ordinary skill in the art.

5) Redundant Power Control:

In some instances, the sensor data aggregation system 200 can be configured to control power conversion and failover 214 of the power input 216 (e.g., 12V power input). In other instances, the sensor data aggregation system 200 can receive instructions from the main autonomous driving compute 212 to modify power inputs and outputs. The sensor data aggregation system 200 can also receive data from the sensors 220 indicating that power outputs and/or inputs be changed. In such an instance, the sensor data aggregation system 200 can change power inputs and/or outputs based on the data received from the sensors 220, independent of receiving instructions from the main autonomous driving compute 212.

"Edge Device":

In some instances, the sensor data aggregation system 200 can integrate several sensor-specific management functions. For example, instead of the main autonomous driving compute 212 performing sensor-specific management functions, the sensor data aggregation system 200 can perform these functions independent from the main autonomous driving compute 212 (e.g., as an "edge device"). In some instances, the BLDC motor 202, the power input 216, the sensors 220, an actuator, and a solenoid may be components of the autonomous vehicle 102.

FIGS. 4A-4C illustrate examples of sensor aggregation processes, according to some aspects of the disclosed technology.

Diagnostics and Data Logging:

As shown in FIG. 4A, the sensor data aggregation system 200 can be configured to perform diagnostics and data logging 400A, which can enable the sensor data aggregation system 200 to have a higher automotive safety integrity level and provide useful debugging and logging information. Such diagnostics and data logging can be performed by the sensor data aggregation system 200 without receiving instructions from the main autonomous driving compute 212.

In some instances, the main autonomous driving compute 212 (e.g., ADSC) can request diagnostics 402. The request can then be abstracted to an Ethernet packet addressed to the sensor data aggregation system 200 (e.g., the pod management module) 404. In response to the request, the sensor data aggregation system 200 can relay information and data from the sensors 220 that may correspond to the overall health of the sensor data aggregation system 200, 406.

Upgrading/Replacing Hardware:

As shown in FIG. 4B, the sensor data aggregation system 200 can be configured to replace and/or upgrade hardware 400B. In some instances, the sensor data aggregation system 200 can include replacing and/or upgrading hardware 408. In other instances, the sensors 220 that may be connected to the sensor data aggregation system 200 can be swamped or changed within the sensor data aggregation system 200, 410. In such an instance, the sensor data aggregation system 200 can remain agnostic of the sensors 220 that the sensor data aggregation system 200 aggregates, and can further be prepared for future expansion 412. This can also allow the sensor data aggregation system 200 to be used in several instances on the autonomous vehicle 102 and to not be paired with a specific sensor set or sensor enclosure.

Cleaning Sensors:

As shown in FIG. 4C, the sensor data aggregation system 200 can be configured to clean the sensors 220, 400C. In some instances, the main autonomous driving compute 212 (e.g., ADSC) can request sensor cleaning 414. The request can be an Ethernet command that can be provided to the sensor data aggregation system 200 (e.g., the pod management module) 416. In response to the Ethernet command, the sensor data aggregation system 200 can adjust inputs and/or outputs to actuate the solenoid 418 to begin cleaning of the sensors 220.

Figure 5:
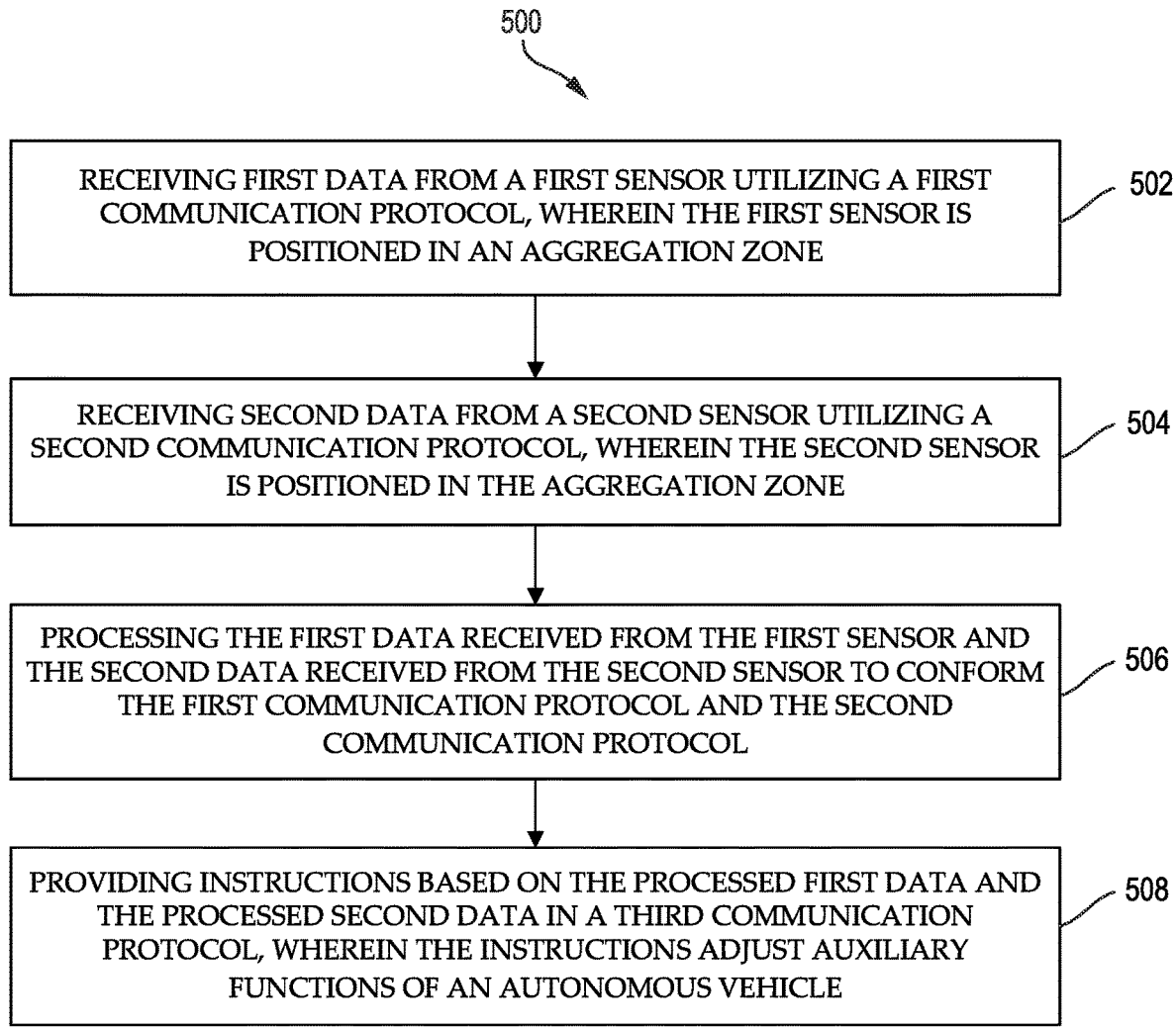
FIG. 5 illustrates an example process for sensor data aggregation, according to some aspects of the disclosed technology.

Having disclosed some example system components and concepts, the disclosure now turns to FIG. 5, which illustrate example method 500 for sensor data aggregation. The steps outlined herein are exemplary and can be implemented in any combination thereof, including combinations that exclude, add, or modify certain steps.

At step 502, the method 500 can include receiving first data from a first sensor utilizing a first communication protocol, wherein the first sensor can be positioned in an aggregation zone.

At step 504, the method 500 can include receiving second data from a second sensor utilizing a second communication protocol, wherein the second sensor can be positioned in the aggregation zone. In some instances, the first communication protocol and the second communication protocol can be firmware of the corresponding sensor.

In other instances, the first sensor and the second sensor may be agnostic to an autonomous vehicle such that the autonomous vehicle may not be paired with a specific sensor set or sensor enclosure.

At step 506, the method 500 can include processing the first data received from the first sensor and the second data received from the second sensor to conform the first communication protocol and the second communication protocol.

At step 508, the method 500 can include providing instructions based on the processed first data and the processed second data in a third communication protocol, wherein the instructions adjust auxiliary functions of an autonomous vehicle.

In some instances, the auxiliary functions of the autonomous vehicle can include at least one of temperature control, sensor cleaning, motor control, data aggregation, and power supply control. In other instances, the sensor cleaning can be actuated by a solenoid. The motor control can be directed by a servo drive to control a motor of the autonomous vehicle. The temperature control can be initiated by the activation of a fan.

In other instances, the third communication protocol can be a communication protocol of a main computer of the autonomous vehicle. The third communication protocol can be different from the first communication protocol and the second communication protocol. In some instances, the first sensor and the second sensor may not be directly connected to the main computer of the autonomous vehicle.

In some instances, the providing of the instructions can be provided to corresponding components of the autonomous vehicle. In other instances, the providing of the instructions to the corresponding components can occur without receiving instructions to adjust the auxiliary functions from a main computer of the autonomous vehicle.

In other instances, the method 500 can further include performing diagnostics and data logging to have a higher automotive safety integrity level and provide useful debugging and logging information. The diagnostics and data logging information can be provided to the main computer to determine the overall health of the autonomous vehicle. In some instances, the method 500 can include receiving a request for diagnostic data. The request for diagnostic data can be abstracted to an Ethernet packet and provided through an Ethernet switch. The method 500 can then relay data from the first sensor and the second sensor to the main computer of the autonomous vehicle in response to the request for diagnostic data.

In some instances, the method 500 can further include replacing and/or upgrading the first sensor and/or the second sensor without conforming the communication protocols of the first sensor and the second sensor with the communication protocol of the main computer of the autonomous vehicle.

In other instances, the method 500 can further include receiving instructions to clean the sensors from the main computer of the autonomous vehicle. The request can be an Ethernet command that can include instructions to actuate a solenoid to begin cleaning of the first sensor and/or the second sensor.

FIG. 6 illustrates an example computing system 600 which can be, for example, any computing device making up internal computing system 110, remote computing system 150, a passenger device executing rideshare application 170, or any other computing device. In FIG. 6, the components of the computing system 600 are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A computer-implemented method comprising:
   receiving first data from a first sensor utilizing a first communication protocol, wherein the first sensor is positioned via a first input/output interface in an aggregation zone;
   adding second data from a second sensor utilizing a second communication protocol, wherein the second sensor is positioned via a second input/output interface in the aggregation zone;
   processing the first data received from the first sensor and the second data added from the second sensor at an aggregation system separate from a main autonomous driving compute service that conforms the first communication protocol and the second communication protocol to provide a removable modular addition of the second sensor data from the second sensor; and
   navigating an autonomous vehicle based on the processed first data and the processed second data in a third communication protocol, wherein the third communication protocol adjusts auxiliary functions of an autonomous vehicle.

2. The computer-implemented method of claim 1, wherein the auxiliary functions of the autonomous vehicle includes at least one of temperature control, sensor cleaning, motor control, data aggregation, and power supply control.

3. The computer-implemented method of claim 2, wherein the sensor cleaning is actuated by a solenoid.

4. The computer-implemented method of claim 2, wherein the motor control is directed by a servo drive to control a motor of the autonomous vehicle.

5. The computer-implemented method of claim 1, wherein the third communication protocol is a communication protocol of a main computer of the autonomous vehicle, wherein the third communication protocol being different from the first communication protocol and the second communication protocol.

6. The computer-implemented method of claim 1, wherein the third communication protocol provides instructions to corresponding components of the autonomous vehicle.

7. The computer-implemented method of claim 6, wherein the providing of the instructions to the corresponding components occurs without receiving instructions to adjust the auxiliary functions from a main computer of the autonomous vehicle.

8. A system comprising:
   one or more processors; and
   at least one computer-readable storage medium having stored therein instructions which, when executed by the one or more processors, cause the system to:
      receive first data from a first sensor utilizing a first communication protocol, wherein the first sensor is positioned via a first input/output interface in an aggregation zone;
      add second data from a second sensor utilizing a second communication protocol, wherein the second sensor is positioned via a second input/output interface in the aggregation zone;
      process the first data received from the first sensor and the second data added from the second sensor at an aggregation system separate from a main autonomous driving compute service that conforms the first communication protocol and the second communication protocol to provide a removable modular addition of the second sensor data from the second sensor; and
      navigate an autonomous vehicle based on the processed first data and the processed second data in a third communication protocol, wherein the third communication protocol adjusts auxiliary functions of an autonomous vehicle.

9. The system of claim 8, wherein the auxiliary functions of the autonomous vehicle includes at least one of temperature control, sensor cleaning, motor control, data aggregation, and power supply control.

10. The system of claim 9, wherein the sensor cleaning is actuated by a solenoid.

11. The system of claim 9, wherein the motor control is directed by a servo drive to control a motor of the autonomous vehicle.

12. The system of claim 8, wherein the third communication protocol is a communication protocol of a main computer of the autonomous vehicle, wherein the third communication protocol being different from the first communication protocol and the second communication protocol.

13. The system of claim 8, wherein the third communication protocol provides instructions to corresponding components of the autonomous vehicle.

14. The system of claim 13, wherein the providing of the instructions to the corresponding components occurs without receiving instructions to adjust the auxiliary functions from a main computer of the autonomous vehicle.

15. A non-transitory computer-readable storage medium comprising:
   instructions stored on the non-transitory computer-readable storage medium, the instructions, when executed by one or more processors, cause the one or more processors to:
      receive first data from a first sensor utilizing a first communication protocol, wherein the first sensor is positioned via a first input/output interface in an aggregation zone;

add second data from a second sensor utilizing a second communication protocol, wherein the second sensor is positioned via a second input/output interface in the aggregation zone;

process the first data received from the first sensor and the second data added from the second sensor at an aggregation system separate from a main autonomous driving compute service that conforms the first communication protocol and the second communication protocol to provide a removable modular addition of the second sensor data from the second sensor; and navigate an autonomous vehicle based on the processed first data and the processed second data in a third communication protocol, wherein the third communication protocol adjusts auxiliary functions of an autonomous vehicle.

16. The non-transitory computer-readable storage medium of claim 15, wherein the auxiliary functions of the autonomous vehicle includes at least one of temperature control, sensor cleaning, motor control, data aggregation, and power supply control.

17. The non-transitory computer-readable storage medium of claim 16, wherein the sensor cleaning is actuated by a solenoid.

18. The non-transitory computer-readable storage medium of claim 16, wherein the motor control is directed by a servo drive to control a motor of the autonomous vehicle.

19. The non-transitory computer-readable storage medium of claim 15, wherein the third communication protocol is a communication protocol of a main computer of the autonomous vehicle, wherein the third communication protocol being different from the first communication protocol and the second communication protocol.

20. The non-transitory computer-readable storage medium of claim 15, wherein the third communication protocol provides instructions to corresponding components of the autonomous vehicle, wherein the providing of the instructions to the corresponding components occurs without receiving instructions to adjust the auxiliary functions from a main computer of the autonomous vehicle.

* * * * *